United States Patent [19]

Buntsis

[11] Patent Number: 4,984,098

[45] Date of Patent: Jan. 8, 1991

[54] POINT OF PURCHASE AUTOMATICALLY-ACTUATED AUDIO ADVERTISING DEVICE AND METHOD

[75] Inventor: Frank Y. Buntsis, Louisville, Ky.

[73] Assignee: Popad, Inc., Louisville, Ky.

[21] Appl. No.: 892,071

[22] Filed: Aug. 1, 1986

[51] Int. Cl.[5] ........................ G08B 23/00; G11B 15/18

[52] U.S. Cl. ........................................ 360/12; 369/19; 340/692; 360/69

[58] Field of Search .................... 340/286 R, 328, 541, 340/692; 360/12, 69, 74.4; 369/19, 20

[56] References Cited

U.S. PATENT DOCUMENTS

| | | | |
|---|---|---|---|
| 2,152,296 | 3/1939 | Weis et al. | 369/20 |
| 2,252,327 | 8/1941 | Lovett et al. | 369/19 |
| 2,595,993 | 5/1952 | Templeman et al. | 340/328 |
| 3,509,288 | 4/1970 | Leventhal . | |
| 4,023,151 | 5/1977 | Markham . | |
| 4,117,461 | 9/1978 | Kiebala . | |
| 4,199,753 | 4/1980 | Gontowski, Jr. . | |
| 4,366,873 | 1/1983 | Levy et al. . | |
| 4,544,920 | 10/1985 | Hamlin . | |
| 4,618,834 | 10/1986 | Adachi | 360/74.4 |
| 4,670,798 | 6/1987 | Campbell et al. | 360/12 |

OTHER PUBLICATIONS

Brochure, "Cam-Talker" Talking Display . . . , CAM Industries, Inc., 1985.

Advertising, "Cooler Door Chime" by Anheuser-Busch, Inc. Item #199-600, ca 1984.

H. Taub, D. Schilling, *Digital Integrated Electronics*, McGraw-Hill Inc., 1977, pp. 562–565.

Data Sheet Timer 555, copied from *Microcomputer Hardware Handbook*, Ing. W. Hofacker GmbH, 1982, edited by W. Hofacker, pp. 634–635.

*Primary Examiner*—Aristotelis M. Psitos
*Assistant Examiner*—David L. Robertson
*Attorney, Agent, or Firm*—Nixon and Vanderhye

[57] ABSTRACT

A point-of-purchase advertising device generates a prerecorded audio message automatically whenever a person is nearby, and then resets itself automatically to prepare for the presence of another person. A motion detector generates a logic level signal whenever movement is sensed. This logic level signal causes a tape recorder to begin generating a prerecorded audio message. The audio output produced by the tape recorder is processed and converted to another logic level signal. This other logic level signal keeps the tape recorder on, and also disables the motion detector. The tape recorder turns off when the prerecorded message is over—since its processed audio output signal is all that keeps it on. The operation of the motion detector remains inhibited, however, until a preset period of time elapses after the prerecorded audio message is over. Inhibiting of the motion detector and the processing of the audio signal permit the advertising device to be used with a variety of different types of available conventional tape recorders/players.

7 Claims, 2 Drawing Sheets

POINT OF PURCHASE AUTOMATICALLY-ACTUATED AUDIO ADVERTISING DEVICE AND METHOD

FIELD OF THE INVENTION

This invention relates to the electronic generation of sound in response to the sensing of non-electrical phenomenon. More particularly, the present invention relates to the detection of the presence of a person and the automatic generation of predetermined audio messages in response to that detected presence. Still more particularly, the invention is related to automatic point-of-purchase advertising devices which play prerecorded taped audio messages whenever a person is nearby.

BACKGROUND OF THE INVENTION

Although advertising in newspapers, in magazines and on television are effective to induce people to buy a product, point of purchase advertising is probably the most effective advertising technique known. By "point of purchase" advertising is meant advertising which reaches the potential buyer at the time and in the place he can actually purchase the product being advertised.

Retailers know the power of point of purchase advertising, and commonly use a variety of point of purchase advertising techniques, such as store front displays, in-store displays, salesmen, in-store video promos, and the like, to increase sales. Although voice messages directed at potential purchasers may be the most effective point of purchase advertising technique, many small retailers cannot afford to pay salesmen to work the retail floor and interest potential customers in purchasing products.

Devices which automatically generate a prerecorded audio message in response to the sensing of the presence of a person are, in general, known. U.S Pat. No. 3,509,288 to Leventhal, for example, discloses a point-of-purchase advertising system which senses the presence of a person by detecting rapid changes in the intensity of ambient light striking a photocell. When person's presence is detected, a tape player is activated to deliver a magnetically prerecorded message. The end of the prerecorded tape is sensed by an optical sensor, and the system is reset in response to the end-of-tape condition.

Cam Industries, Inc. of Topeka, Kansas sells a "cam-talker" device which automatically plays a taped message when a shopper walks by a point-of-purchase display. An ordinary tape recorder is used to record several messages on a continuous tape. Three-second pauses are left on the tape between recorded messages. The "cam-talker" device starts the tape when it senses the presence of a person nearby. The "cam-talker" device automatically senses the pause on the tape at the end of the message and automatically stops the tape before the next message begins playing.

Anheuser Busch, Incorporated, in conjunction with Solarts, Inc. of Colorado Springs, Colorado, sells a cooler door chime which is adapted for installation on the door of a beer cooler. When the cooler door is opened, a motion detector within the device controls an integrated circuit to generate a musical "jingle".

U.S. Pat. No. 4,117,461 to Kiebala discloses a device adapted for installation within a refrigerator which senses the removal of food from the shelves of the refrigerator and responsively activates a tape recorder. The tape recorder plays a prerecorded message encouraging dieting.

U.S. Pat. No. 4,023,151 to Markham discloses a device which uses photocells to sense the passage of a person over a doorstep, and actuates a tape player to play a prerecorded audio message reminding the departing person to perform certain tasks prior to leaving the house (e.g., lock the door or turn off the iron). A prerecorded end-of-message tone recorded on the tape at the end of the prerecorded message is decoded by a tone detector, turning the system off.

U.S. Pat. No. 4,544,920 to Hamlin discloses an intruder detection system which detects noise made by an intruder and activates a tape player which plays a tape recording of a barking dog or other building occupancy sounds. An endless loop tape cassette is used to avoid having to rewind the tape.

U.S. Pat. No. 4,366,873 to Levy et al discloses an electronic scale which synthesizes voice messages in response to measured weight, information inputted to the scale via a keyboard, and prestored digital information.

There is a need for a point-of-purchase audio advertising device which accurately and reliably detects the presence of a person but which does not continuously play back audio messages. The point-of-purchase advertising device should be sensitive enough to detect whenever a shopper passes nearby. Yet, a point-of-purchase advertising device having great sensitivity may constantly sense passersby when the retail floor is crowded, causing continuous playback of the prerecorded messages.

A shopper must remain within hearing range of the message being played for the message to be effective. A message which plays continuously isn't nearly as effective as one which is played especially for a shopper in response to the shopper's presence—since a person may be more interested in a message which he realizes is being played just for him. Prior art point of purchase advertising devices behave unpredictably and/or continuously play messages when operated in a crowded store—the best place to use such devices.

Purchasers and users of a point-of-purchase advertising device also often wish to use an unmodified, conventional tape recorder for recording and playing back prerecorded messages. Conventional cassette tape recorders are readily available and relatively inexpensive, thus decreasing the cost of the point-of-purchase advertising device. High-quality recordings including mixed voice, music and sound effects can be made using conventional cassette recording equipment to improve the effectiveness of the advertising.

However, the point-of-purchase advertising device must control the conventional tape recorder with absolute reliability, and should also be adaptable for use with any of a variety of different types of tape recorders. Different tape recorders have different critical characteristics, such as the amount of electronic noise they generate and the speed at which they start and stop. Because of these differences, a prior art point-of-purchase advertising device may work well with some tape recorders and yet control other tape recorders in an unreliable or unpredictable manner. There is therefore a need for a point-of-purchase advertising device which accurately controls virtually any type of tape recorder.

SUMMARY OF THE INVENTION

The present invention provides a point-of-purchase selling device which automatically detects passersby and responsively produces prerecorded promotional audio messages. The present invention has features which make it more flexible and reliable than prior art point-of-purchase selling devices.

In accordance with one important feature of the invention, a detector which senses the presence of passersby is inhibited whenever the advertising message is being played and for a time after the message has ended.

A first detector produces a first electrical signal upon detection of a person nearby. A second detector operatively connected to a tape recorder produces a second electrical signal whenever the tape recorder is producing audio. A controller controls the operation of the tape recorder and the first detector, and is connected to receive the first and second electrical signals.

The controller enters a first control state upon receipt of the first electrical signal from the first detector (indicating a person is nearby). When in the first control state, the controller inhibits the first detector and enables the tape recorder. The controller enters a second control state in response to discontinuance of the second signal (indicating the prerecorded message has finished playing). When in the second control state, the controller inhibits the tape recorder and enables the first detector.

The controller may include a timer which times a predetermined period of time beginning upon discontinuance of the second signal. The controller may continue to inhibit the first detector from operating until this time period has elapsed.

Because the passerby detector is inhibited during the time a message is being played (and for a period of time after the message is over), a point-of-purchase advertising device in accordance with the present invention cannot be retriggered while it is playing a message. Reliable operation is thus obtained even in a crowded environment—and undesired continuous playback of prerecorded messages is avoided. Moreover, because retriggering cannot occur until well after a message has ended and the tape recorder has been controlled to stop, the present invention can be used with inexpensive tape recorders (which start up and stop slowly) without any danger of tape breakage and/or audible "wow" at the beginning of messages.

In accordance with another important feature of the invention, the presence of a person nearby is detected and an audio signal of finite duration is generated in response to the detected presence. The audio signal is filtered, rectified and limited (particular advantageous circuitry of the present invention may be used to perform such signal processing). The generation of the audio signal is terminated in response to cessation of the filtered, rectified and limited audio signal.

Because the present invention processes the audio signal and uses this processed signal to determine when the audio message has ended, a conventional tape recorder may be used to record and play back messages—and no special means for indicating the end of a message (e.g., leader sensing, tone sensing and the like) is required. Moreover, the advantageous audio signal processing used by the invention permits reliable and accurate determination of the end of message condition, even when used with tape recorders which produce a lot of electrical noise (for example, due to noisy electronics and/or noise prerecorded on the tape being played back).

BRIEF DESCRIPTION OF THE DRAWINGS

These and other features and advantages of the present invention will be more readily understood by referring to the following detailed description of preferred embodiments in conjunction with the appended sheets of drawings, of which.

DETAILED DESCRIPTION OF PREFERRED EMBODIMENTS

Figure 1:
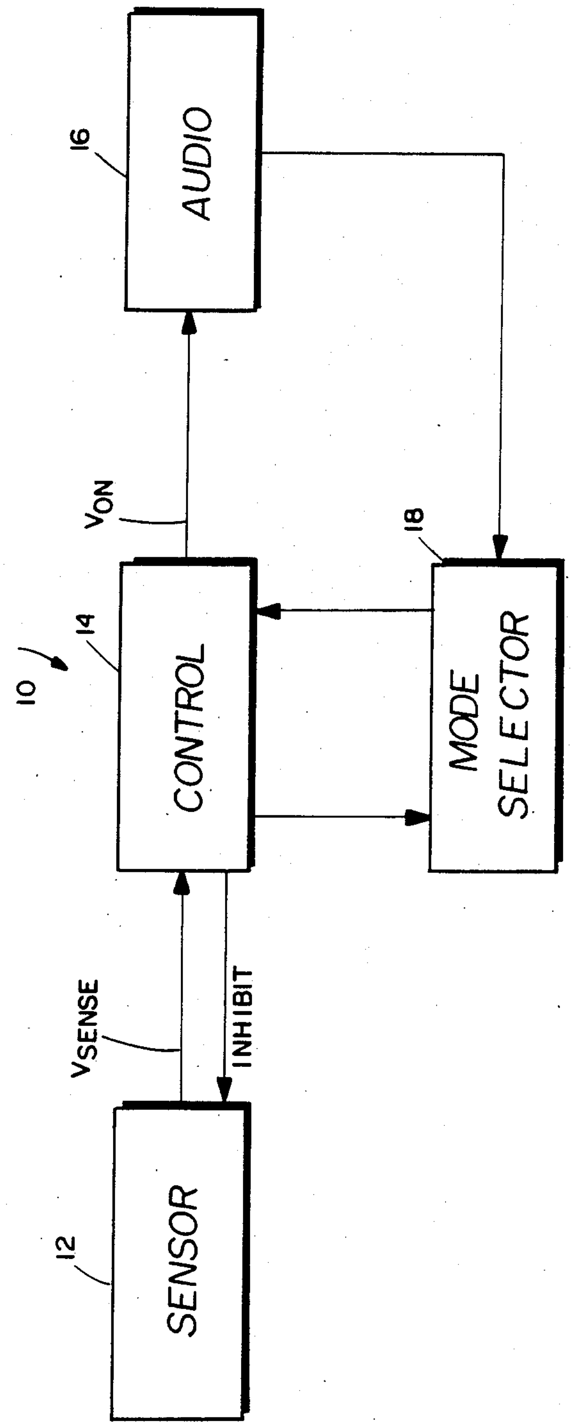
FIG. 1 is a block diagram of the presently preferred exemplary embodiment of a point-of-purchase selling device in accordance with the present invention.

FIG. 1 is a schematic block diagram of the presently preferred exemplary embodiment of a point-of-purchase audio device 10 in accordance with the present invention. Audio device 10 includes four main functional blocks: a sensor block 12, a controller block 14, an audio block 16, and a mode selector block 18.

Sensor block 12 (a first detecting means) detects the presence of people in proximity to audio device 10. When sensor block 12 detects a passerby approaching audio device 10, it generates a control signal $V_{sense}$ which is applied to the input of controller block 14. In response to the control signal $V_{sense}$, controller block 14 enters a first control state and produces a further control signal $V_{on}$ which controls the operation of audio block 16.

Audio block 16 generates a prerecorded audio message in response to the control signal $V_{on}$. Mode selector block 18 (which may be regarded as a second detecting means) is operatively connected to the audio output of audio block 16, and senses when audio is being produced by the audio block. Control block 14 produces an INHIBIT signal in response to sensing by mode selector block 18 that the prerecorded audio message has begun, this INHIBIT signal inhibiting the sensor block 12 from operating.

When mode selector block 18 senses the prerecorded audio message has ended, it applies control signals to controller block 14 which cause the controller block to enter a second control state and to stop the audio block 16 from producing audio. The controller block 14 times a preset time period beginning when mode selector block 18 senses the message has ended, and reenables the sensor block 12 when this time period has elapsed. These control signals also reset the controller block to prepare it for the next sensed presence.

Figure 2:
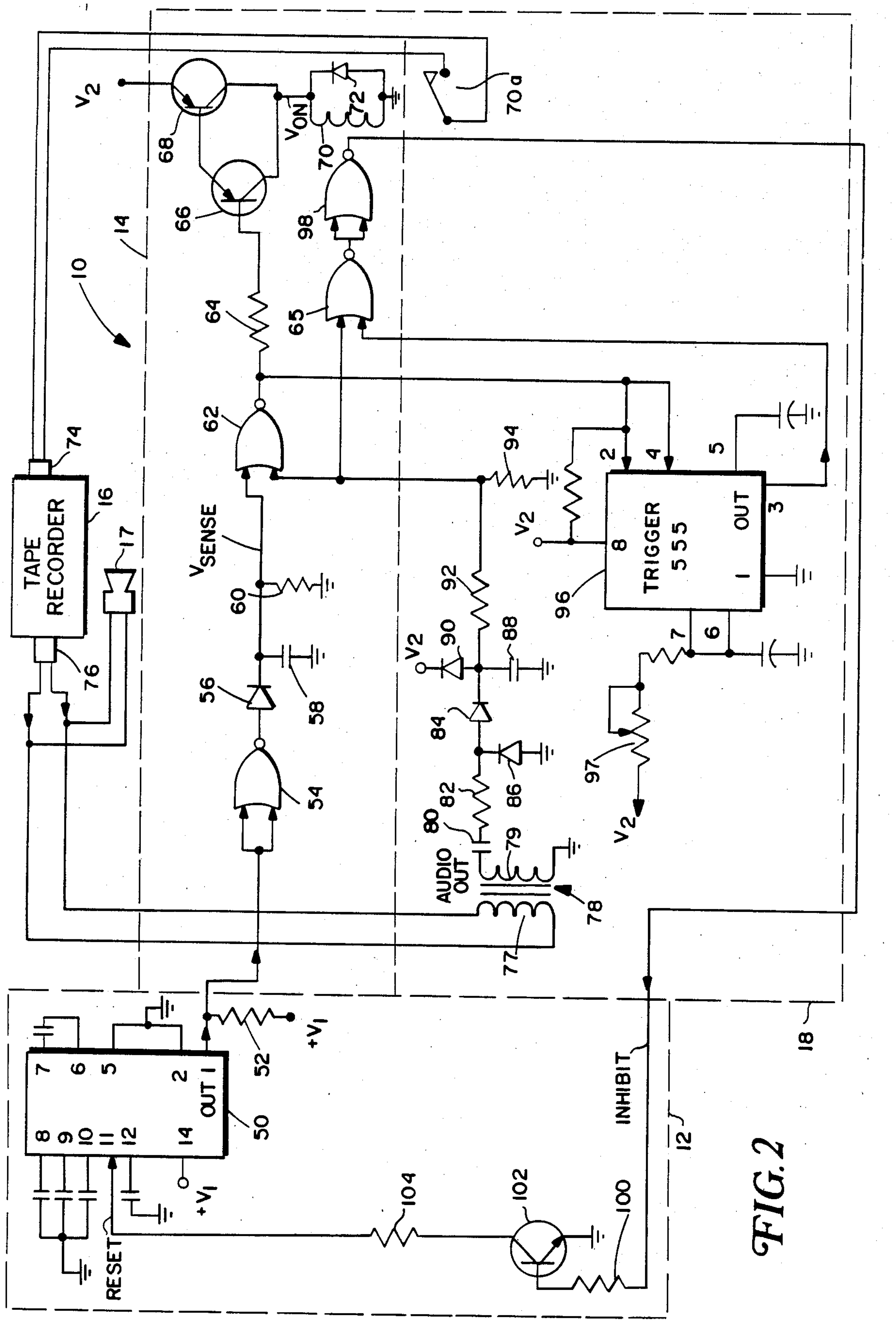
FIG. 2 is a detailed schematic diagram of the embodiment shown in FIG. 1.

FIG. 2 is a detailed schematic diagram of the embodiment shown in FIG. 1. The blocks of FIG. 1 are shown in FIG. 2 as dotted lines.

Sensor block 12 may use a variety of different techniques (such as ultrasonic sensing, infrared sensing, optical sensing, etc.) to sense the presence of a person. In the preferred embodiment, sensor block 12 includes a ULM-2232A integrated circuit motion detector 50 manufactured by Sprague Electric Company of North Adams, Massachusetts (for example, integrated circuit motion detector 50 may be of the type disclosed in U.S. Pat. No. 4,199,753 to Gontowski, Jr.). Motion detector 50 senses motion at a distance of eight feet over a surveillance diameter of two feet by detecting changes in ambient light. Motion detector 50 in the preferred embodiment is very sensitive, and can sense as little as a ±5% change in ambient light intensity.

Motion detector 50 produces a 100 mW AC audio signal at its OUT terminal when it detects the presence of a person. This OUT terminal is pulled up by a resistor 52 (having a value of 3.9 kilohms in the preferred embodiment) which is connected between $V_1$ (a 3.3 volt DC power supply voltage in the preferred embodiment) and the OUT terminal. This control signal $V_{sense}$ produced by the OUT terminal is thus normally at logic level 1, and alternates between logic levels 0 and 1 (for about four seconds with a periodic frequency in the audio range of 200 Hz to 1000 Hz) whenever motion detector 50 detects the presence of a person in proximity to audio device 10.

The $V_{sense}$ control signal is connected to two tied-together inputs of a NOR gate 54 (this NOR gate is connected as an inverter/buffer). NOR gate 54 inverts the $V_{sense}$ signal—and therefore normally at logic level 0, but alternates between logic levels 0 and 1 when detector 50 detects the presence of a passerby.

The output of NOR gate 54 is connected to the anode of a series-connected diode 56. The cathode of diode 56 is connected to one plate of a capacitor 58 (0.47 microfarads in the preferred embodiment). The other plate of capacitor 58 is connected to ground potential. A resistor 60 (150 kilohms in the preferred embodiment) is connected in parallel with capacitor 58.

Capacitor 58, resistor 60 and diode 56 together function as an integrating network which integrates the alternating signal produced by detector 50 (and buffered by NOR gate 54) to yield a logic level 1 pulse.

The anode of diode 56 is connected to one input of a two-input NOR gate 62. The output of NOR gate 62 is connected through a series resistor 64 to the base of a PNP transistor 66.

The emitter of transistor 66 is connected to the base of a further PNP transistor 68, while the collectors of transistors 66 and 68 are connected together. Transistors 66 and 68 are connected in the Darlington configuration. The common collectors of transistors 66 and 68 are connected to one end of a relay coil 70, the other end of the coil being connected to ground potential. A diode 72 is connected across the coil 70 to protect the coil (and to prevent back emf generated by the coil from damaging the transistors).

The emitter of transistor 68 is connected in the preferred embodiment to power supply voltage $V_2$ (+5 VDC) When either output of NOR gate 62 rises to logic level 1, the output of NOR gate 62 (which is normally at logic level 1) falls to logic level 0 and thus turns transistor 68 ON. When transistor 68 turns ON, a circuit is completed between $V_2$ and relay coil 70, energizing the relay coil. A set of normally-open relay contacts **70*a* close whenever coil 70** is energized.

Relay contacts **70*a* are connected across the "ground" and "center" terminals of a conventional "sub-miniature" phone plug 74. Phone plug 74 is mated with the "remote" phone jack of a conventional tape recorder 16 of the type which starts and stops its tape drive whenever the center conductor of its "remote" phone jack is shorted to ground (such "remote" phone jacks are commonly provided on cassette tape recorders for connection to microphone-mounted on-off switches). The state of NOR gate 62 controls the state of transistor 68, and thereby controls the operation of tape recorder 16**.

The audio output jack ("earphone jack") of tape recorder 16 is mated with a conventional audio-type "miniature" phone plug 76. Phone plug 76 is connected to external loudspeaker 17, and is also connected across the primary winding 77 of an audio transformer 78 (this transformer may have an impedance ratio of 8 ohms:500 ohms or some other suitable ratio). Tape recorder 16 delivers an audio signal to the transformer primary winding and to the loudspeaker whenever relay contacts **70*a*** are closed.

One end of the secondary winding 79 of audio transformer 78 is connected to ground potential, while the other end is connected to one plate of a series-connected capacitor 80. The other plate of capacitor 80 is connected to one end of a series-connected resistor 82. The anode of a diode 84 is connected to the further end of resistor 82. The cathode of a further diode 86 is connected to the anode of diode 84, the anode of diode 86 being connected to ground potential. The cathode of diode 84 is connected to a plate of a capacitor 88, the other plate of which is connected to ground potential. The cathode of diode 84 is also connected to the anode of yet another diode 90. The cathode of diode 90 is connected to supply voltage $V_2$ (+5 VDC in the preferred embodiment). The cathode of diode 84 is also connected to one end of a series-connected resistor 92. The other end of resistor 92 is connected to the other input of NOR gate 64, and also to a first end of a resistor 94. The other end of resistor 94 is connected to ground potential.

Signal processing components 80 through 94 serve at least three functions: they limit the voltage applied to the input of NOR gate 62 to prevent damage to the gate; they filter out high-frequency noise produced by the audio output of tape recorder 16; and they convert the analog AC audio output of the tape recorder to a TTL digital logic level.

Capacitor 80 and resistor 82 function as a low pass filter which eliminates high-frequency audio noise generated by tape recorder 16 from the signal generated across secondary winding 79 of transformer 78. High frequency components are removed so that signals present at the further end of resistor 82 are attributable only to voice and/or music being produced at the audio output of tape recorder 16—and not to noise or hiss produced by the electronics of the tape recorder and/or reproduced from the tape.

Diode 86 shorts all negative excursions of the signal present at the further end of resistor 82 to ground (and thus acts as a half-wave rectifier). Series-connected diode 84 conducts only when the voltage present at the further end of resistor 82 is at least one diode drop above the voltage across capacitor 88. Diode 90 conducts to the power supply any voltage levels across capacitor 88 which exceed $V_2$ (about 5 volts DC in the preferred embodiment). Hence, the diode network comprising diodes 84, 86 and 90 acts as a limiter/rectifier circuit.

Capacitor 88 filters the limited, rectified audio signal such that a DC voltage having a level corresponding to the average AC level of the audio produced by tape recorder 16 is present across the capacitor. A voltage divider formed by resistors 92 and 94 divide this signal to produce a TTL level signal.

The voltage divider comprising resistors 92 and 94 applies a logic level 1 signal to the input of NOR gate 62 (and to an input of a NOR gate 65) whenever the audio of a prerecorded message is produced at the audio output of tape recorder 16, and applies a logic level 0 signal to the input of this NOR gate when tape recorder 16 is off and/or when the prerecorded message has ended (disappearance of the audio signal causes capacitor 88 to discharge through resistors 92 and 94).

The volume control of tape recorder 16 is set to a level which produces sufficient audio output emanating from loudspeaker 17 to permit a person in proximity to audio device 10 to hear the prerecorded, taped advertising message played back by the tape recorder (and to produce a signal of a suitable level across capacitor 88).

The output of NOR gate 62 is also connected to the trigger input of a integrated circuit "timer" 96 (an NE-555 integrated circuit is used in the preferred embodiment). Timer 96 provides an adjustable time delay when an audio message has finished playing.

Timer 96 is operated in its monostable mode (as a "restartable one-shot"), meaning that the signal produced at its OUT terminal is normally at logic level 0, but rises to logic level 1 and remains there for a predetermined (adjustable) period of time whenever a logic 1 signal is applied to the timer trigger input (pins 2 and 4). Further details concerning the operation of timer 90 may be found, for example, at pages 562–565 of Taub and Schilling, *Digital Integrated Electronics* (McGraw-Hill 1977).

The cycle time of the monostable operation of timer 96 can be adjusted by varying the resistance of potentiometer 97. The logic level signal produced at the OUT terminal (pin 3) of timer 96 rises from logic level 0 to logic level 1 in response to a triggering pulse produced by NOR gate 62 (and applied to the trigger input of the timer), remains at logic level 1 for a preset time period, and then returns to logic level 0.

The signal produced at the OUT terminal of timer 96 is applied to the further input of NOR gate 65 (as will be recalled, the other input of this NOR gate is connected to the filtered and rectifier tape recorder audio signal). The output of NOR gate 65 is connected to the two tied-together inputs of a further NOR gate 98 (this further NOR gate is connected as an inverter). The output of NOR gate 98 is connected to one end of a resistor 100 the other end of which is connected to the base of a NPN transistor 102. The emitter of transistor 102 is connected to ground potential, and the collector of the transistor is connected to one end of a resistor 104 (having a value of 820 ohms in the preferred embodiment). The other end of resistor 104 is connected to the "reset" input of motion detector 50.

The operation of the circuit shown in FIG. 2 will now be described. When integrated circuit 50 detects a change in ambient light (such as might be caused by a person moving into proximity with audio device 10), it produces a train of alternating pulses at its output terminal OUT for about four (4) seconds. This pulse signal is inverted and buffered by NOR gate 54, and filtered by components 56–60 to produce a signal $V_{sense}$ which is normally at logic level 0 but which rises to logic level 1 whenever integrated circuit 50 has sensed a person's presence. $V_{sense}$ is connected to one input of NOR gate 62 so that this NOR gate "sees" one of its inputs rise from logic level 0 to logic level 1 upon detection of a person nearby.

Tape recorder 16 is normally off (since relay contacts 70*a* are normally open), and therefor produces no audio output--so that the other input of NOR gate 62 is normally at logic level 0 (causing the output of NOR gate 62 to normally rest at logic level 1). When $V_{sense}$ rises from logic level 0 to logic level 1, the output of NOR gate 62 changes from logic level 1 to logic level 0, thereby turning PNP transistors 66 and 68 ON and energizing relay coil 70.

Relay contacts 70*a* close when relay coil 70 is energized, controlling tape recorder 16 to start. The tape recorder 16 begins playing a prerecorded audio message through speaker 17 to provide the detected passerby with a point-of-purchase audio promotional message. The audio output of tape recorder 16, after being rectified by components 77–84, charges capacitor 88 and produces a logic level 1 on the further input of NOR gate 62. The output of NOR gate 62 remains at logic level 0 so long as either one of its inputs remains at logic level 1—so that relay contacts 70*a* remain closed (regardless of the output produced by motion detector 50) for the entire duration of the prerecorded message being played back by tape recorder 16.

The network of NOR gate 65, NOR gate 98 and timer 96 disables motion detector 50 whenever tape recorder 16 is enabled.

Motion detector 50 is disabled by grounding its pin 11. Transistor 102 selectively grounds pin 11 of motion detector 50 (through resistor 104) whenever drive is applied to the base of the transistor. NOR gates 65 and 98 produce a signal which turns transistor 102 ON whenever either (a) timer 96 is producing an output at its terminal OUT, or (b) tape recorder 16 is producing an audio signal (i e., a logic level 1 signal is present at the junction of resistors 92 and 94).

Motion detector 50 is first disabled soon after it detects the presence of a person (since timer 96 produces an output in response to the output produced by NOR gate 62). Motion detector 50 is thus ordinarily first inhibited at about the same time that tape recorder 16 is turned on. Once tape recorder 16 begins producing audio, the detected, filtered and rectified audio signal applied to the other input of NOR gate 65 causes motion detector 50 to remain inhibited so long as tape recorder 16 continues to produce audio. When the audio message being produced by tape recorder 16 ends, timer 96 continues to produce an output for an adjustable time period thereafter (since NOR gate 62 produces an output until audio is no longer detected by components 77–94, and the output of NOR gate 62 drives the trigger input of timer 96)—preventing tape recorder 16 from starting again until timer 96 has timed out its preset time delay.

In summary, advertising device 10 starts tape recorder 16 when the presence of a person is sensed by motion detector 50, and then disables the motion detector for the duration of the audio message being played back by the tape recorder plus an additional time period timed by timer 96. Hence, motion detector 50 and associated components 52–60 shown in FIG. 2 only affect the operation of advertising device 10 during times when tape recorder 16 is not turned ON—these components serve only to turn on the tape recorder. Once the tape recorder is turned on, it remains on for the entire duration of a continuous prerecorded message (preferably the message is of finite duration) it plays back, and is shut off immediately thereafter. Motion detector 50 is not reenabled until the time period timed by timer 96 elapses after the prerecorded audio message finishes playing (thereby preventing the audio message from playing continuously during times many people pass device 10).

While the present invention has been described with what is presently considered to be the most practical and preferred embodiments, it is to be understood that the appended claims are not to be limited to the disclosed embodiments, but on the contrary, are intended to cover modifications, variations, and/or equivalent arrangements which retain any of the novel features and advantages of this invention.

By way of non-limiting example, mode selector 18 of the preferred embodiment could be modified to mute loudspeaker 17 (for example, by opening a relay-actuated switch connecting the loudspeaker to the audio output of tape recorder 16) when components 79–94 detect that the audio message being played back by the tape recorder has finished. The tape recorder could then be controlled to continue playing back its tape until audio is once again encountered, at which time, the tape recorder could be quickly stopped by the mode selector block. A tape recorder 16 which starts and stops rapidly should be used with this alternate embodiment to prevent much of the beginning of the prerecorded message from being "missed" and to ensure that the tape is travelling at the correct speed when the beginning of the message is being played.

Alternatively, mode selector block 18 could mute loudspeaker 17 when the end of the prerecorded message is detected, and then sense (using a conventional tone decoder circuit connected, for example, to resistor 82) a tone of a predetermined frequency prerecorded on the tape being at a position indicating the end of the message being played and the beginning of the next message. When the tone plays, mode selector 18 could control NOR gate 62 to stop tape recorder 16, thus preparing it for the next message to be played.

The embodiment described can be used with any conventional tape recorder. For example, a regular cassette tape recorder with a remote speaker and an endless loop cassette can be used, and one or several messages can be recorded on the endless loop cassette tape. Alternatively, it might be desirable to use a cassette recorder with an automatic reverse play capability to permit the use of a regular cassette tape with messages prerecorded on both sides.

What is claimed is:

1. A point-of-purchase advertising apparatus of the type adapted to control the operation of a tape recorder, said apparatus comprising:

first detecting means having an enabled state and a disabled state for producing a first electrical output signal in response to a person nearby when in said enabled state, said first detecting means producing no first output signal when in said disabled state;

second detecting means operatively connected to said tape recorder for producing a second electrical output signal whenever said tape recorder is producing audio;

tape recorder control means, operatively connected to said first and second detecting means and to said tape recorder, for activating said tape recorder in response to the presence of any of said first and second output signals and for substantially immediately deactivating said tape recorder in response to the absence of both said first and second output signals; and a single timing means connected to receive said first and second output signals and connected to control said first detecting means for disabling said first detecting means beginning upon receipt of any of said first and second output signals, said timing means also for timing a preset time interval upon loss of both of said first and second output signals, said timing means continuing to disable said first detecting means whenever either of said first and second output signals are present and thereafter for continuing to disable said first detecting means for the duration of said preset time interval.

2. A point-of-purchase advertising apparatus of the type adapted to control the operation of a tape recorder, said apparatus comprising:

first detecting means for producing a first electrical signal upon detection of a person nearby;

second detecting means operatively connected to said tape recorder for producing a second electrical signal whenever said tape recorder produces audio; and control means, operatively connected to said first and second detecting means and to said tape recorder, for controlling the operation of said tape recorder and said first detecting means, said control means entering a first control state in response to receipt of said first electrical signal wherein said first detecting means is inhibited and said tape recorder is enabled, said control means entering a second control state in response to discontinuance of said second electrical signal wherein said tape recorder is inhibited and said first detecting means is enabled;

wherein said second detecting means comprises;

an audio transformer having a primary winding and a secondary winding, said primary winding connected to receive an electrical audio signal produced by said tape recorder, said secondary winding having first and second terminals, said second terminal being connected to ground;

a series resistor-capacitor network (80, 82) connected to said secondary winding first terminal;

a diode (86) having a cathode connected to said resistor-capacitor network and an anode connected to ground;

a further diode (84) having an anode connected to said first-mentioned diode cathode and also having a cathode;

a capacitor (88) connected between said further diode cathode and ground;

a still further diode (90) having an anode connected to the cathode of said further diode (84) and having a cathode connected to a positive voltage reference level;

a resistor (92) having a first end connected to said further diode (84) anode and having a second end; and a further resistor (94) connected between said resistor (92) second end and ground, said second electrical signal being available at the connection between said resistor (92) second end and said further resistor (94).

3. A point-of-purchase advertising apparatus of the type adapted to control the operation of a tape recorder, said apparatus comprising:

first detecting means for producing a first electrical signal upon detection of a person nearby;

second detecting means operatively connected to said tape recorder for producing a second electrical signal whenever said tape recorder produces audio; and control means, operatively connected to said first and second detecting means and to said tape recorder, for controlling the operation of said tape recorder and said first detecting means, said control means entering a first control state in response to receipt of said first electrical signal wherein said first detecting means is inhibited and said tape recorder is enabled, said control means entering a second control state in response to discontinuance of said second electrical signal wherein said tape recorder is inhibited and said first detecting means is enabled;

wherein said control means includes:

logic means, connected to receive said first and second electrical signals, for producing a control signal at an output thereof in response to either said first or said second signal;

a series resistor having a first end connected to said logic means output and also having a second end;

a Darlington transistor network having a control terminal and first and second switching terminals, said control terminal connected to said series resistor second end, said first switching terminal connected to a power supply voltage level; and a relay having a coil connected between ground and said transistor network second switching terminal, said relay having a set of normally-open contacts which close in response to energization of said coil, said contacts being connected between first and second switching connections of said tape recorder.

4. A point-of-purchase advertising apparatus of the type adapted to control the operation of a tape recorder, said apparatus comprising:

first detecting means for producing a first electrical signal upon detection of a person nearby;

second detecting means operatively connected to said tape recorder for producing a second electrical signal whenever said tape recorder produces audio; and control means, operatively connected to said first and second detecting means and to said tape recorder, for controlling the operation of said tape recorder and said first detecting means, said control means entering a first control state in response to receipt of said first electrical signal wherein said first detecting means is inhibited and said tape recorder is enabled, said control means entering a second control state in response to discontinuance of said second electrical signal wherein said tape recorder is inhibited and said first detecting means is enabled;

wherein said first detecting means includes:

means for producing a detection signal in response to changes in ambient light level;

a diode having an anode connected to receive said detection signal and having a cathode;

a capacitor connected between said diode cathode and ground potential; and a resistor connected between said diode cathode and ground potential, wherein said first electrical signal is produced at said diode cathode.

5. A point-of-purchase advertising apparatus comprising:

means for detecting the presence of a person nearby and for producing a first logic level signal in response to said detected presence;

logic means, connected to receive said first logic level signal and a second logic level signal at respective inputs thereof, for producing a control signal at an output thereof in response to either said first or said second logic level signals;

audio signal generating means, connected to receive said control signal, for generating an audio signal at an output thereof in response to said control signal; and signal processing means, connected to said audio signal generating means output, for filtering said audio signal, for rectifying and limiting said filtered signal, for converting said rectified and filtered signal to said second logic level signal and for applying said second logic level signal to said logic means input;

wherein said signal processing means comprises:

an audio transformer having a primary winding and a secondary winding, said primary winding connected to receive said electrical audio signal, said secondary winding having first and second terminals, said second terminal being connected to ground;

a series resistor-capacitor network (80, 82) connected to said secondary winding first terminal;

a diode (86) having a cathode connected to said resistor-capacitor network and an anode connected to ground;

a further diode (84) having an anode connected to said first-mentioned diode cathode and also having a cathode;

a capacitor (88) connected between said further diode cathode and ground;

a still further diode (90) having an anode connected to the cathode of said further diode (84) and having a cathode connected to a positive voltage reference level;

a resistor (92) having a first end connected to said further diode (84) anode and having a second end; and a further resistor (94) connected between said resistor (92) second end and ground, said second logic level signal being available at the connection between said resistor (92) second end and said further resistor (94).

6. A point-of-purchase advertising apparatus comprising:

means for detecting the presence of a person nearby and for producing a first logic level signal in response to said detected presence;

logic means, connected to receive said first logic level signal and a second logic level signal at respective inputs thereof, for producing a control signal at an output thereof in response to either said first or said second logic level signals;

audio signal generating means, connected to receive said control signal, for generating an audio signal at an output thereof in response to said control signal; and signal processing means, connected to said audio signal generating means output, for filtering said audio signal, for rectifying and limiting said filtered signal, for converting said rectified and filtered signal to said second logic level signal and for applying said second logic level signal to said logic means input;

a series resistor having a first end connected to said logic means output and also having a second end;

a Darlington transistor network having a control terminal and first and second switching terminals, said control terminal connected to said series resistor second end, said first switching terminal connected to a power supply voltage level; and a relay having a coil connected between ground and said transistor network second switching terminal, said relay having a set of normally-open contacts which close in response to energization of said coil, said contacts being connected between first and second switching connections of said audio signal generating means.

7. A point-of-purchase advertising apparatus comprising:

means for detecting the presence of a person nearby and for producing a first logic level signal in response to said detected presence;

logic means, connected to receive said first logic level signal and a second logic level signal at respective inputs thereof, for producing a control signal at an output thereof in response to either said first or said second logic level signals;

audio signal generating means, connected to receive said control signal, for generating an audio signal at an output thereof in response to said control signal; and signal processing means, connected to said audio signal generating means output, for filtering said audio signal, for rectifying and limiting said filtered signal, for converting said rectified and filtered signal to said second logic level signal and for applying said second logic level signal to said logic means input;

a diode having an anode connected to said first logic level signal and having a cathode:

a capacitor connected between said diode cathode and ground potential; and a resistor connected between said diode cathode and ground potential, said diode cathode being connected said logic means input.

* * * * *